(12) United States Patent
Cheng et al.

(10) Patent No.: US 12,437,851 B1
(45) Date of Patent: Oct. 7, 2025

(54) METHODS, SYSTEMS, AND COMPUTER PROGRAM PRODUCTS FOR SELECTING CRITERIA SUBSETS FOR PERFORMING A MEDICAL NECESSITY REVIEW FOR A PATIENT CARE PLAN

(71) Applicant: Optum, Inc., Minnetonka, MN (US)

(72) Inventors: Carol Cheng, Seattle, WA (US); Ian Gilbert, Arlington, MA (US); Changsung Moon, Kirkland, WA (US); Feng Yi, San Mateo, CA (US); Feili Yu, Shoreline, WA (US); Fan Zhou, Redmond, WA (US)

(73) Assignee: OPTUM, INC., Minnetonka, MN (US)

(*) Notice: Subject to any disclaimer, the term of this patent is extended or adjusted under 35 U.S.C. 154(b) by 306 days.

(21) Appl. No.: 18/189,485

(22) Filed: Mar. 24, 2023

(51) Int. Cl.
*G16H 20/00* (2018.01)
*G16H 10/60* (2018.01)
*G16H 40/20* (2018.01)

(52) U.S. Cl.
CPC ............ *G16H 20/00* (2018.01); *G16H 10/60* (2018.01); *G16H 40/20* (2018.01)

(58) Field of Classification Search
CPC ......... G16H 20/00; G16H 40/20; G16H 10/60
See application file for complete search history.

(56) References Cited

U.S. PATENT DOCUMENTS

| | | | |
|---|---|---|---|
| 8,714,983 B2* | 5/2014 | Kil | G16H 50/30 434/247 |
| 10,699,215 B2* | 6/2020 | Devarakonda | G06N 5/022 |
| 11,184,298 B2* | 11/2021 | Freed | G06F 18/23 |
| 11,508,251 B2* | 11/2022 | He | G06N 3/045 |
| 11,556,810 B2* | 1/2023 | Perera | G06N 5/04 |
| 11,574,147 B2* | 2/2023 | Umeda | G06F 18/24133 |
| 11,694,800 B2* | 7/2023 | Eleftherou | G06N 5/02 703/11 |
| 11,874,879 B2* | 1/2024 | Yerva | G16H 40/67 |
| 12,136,492 B2* | 11/2024 | Molony | G06N 5/022 |

(Continued)

OTHER PUBLICATIONS

Chen, 2020, Elsevier, pp. 1-12.*
Hoang, Elsevier, 2019, pp. 1-12.*

*Primary Examiner* — Michael I Ezewoko
(74) *Attorney, Agent, or Firm* — MARSHALL, GERSTEIN & BORUN LLP (57) ABSTRACT

A method includes receiving input information associated with a health record of a patient, the input information comprising information associated with a plurality of input variables; embedding the information associated with the plurality of variable to generate a plurality of input variable vectors, respectively; aggregating the plurality of input variable vectors to generate a patient health record vector; generating, using a knowledge graph, a first ranking of a plurality of subsets of criteria used for determining an appropriateness of a care plan for the patient based on the patient health record vector; generating, using an artificial intelligence engine, a second ranking of the plurality of subsets of the criteria used for determining the appropriateness of the care plan for the patient based on the patient health record vector; and generating a final ranking of the plurality of subsets of the criteria used for determining the appropriateness of the care plan for the patient based on the first ranking and the second ranking.

20 Claims, 7 Drawing Sheets

(56) References Cited

U.S. PATENT DOCUMENTS

| | | | |
|---|---|---|---|
| 12,170,148 B2 * | 12/2024 | Eun | G16H 50/50 |
| 12,211,619 B2 * | 1/2025 | Molony | G16H 70/60 |
| 12,271,907 B2 * | 4/2025 | Chopra | G06F 40/289 |
| 2008/0146334 A1 * | 6/2008 | Kil | G06Q 40/08 |
| | | | 463/36 |
| 2019/0251480 A1 * | 8/2019 | Garcia Duran | G06N 20/20 |
| 2019/0348178 A1 * | 11/2019 | Eleftherou | G16H 50/50 |
| 2020/0185102 A1 * | 6/2020 | Leventhal | G06F 40/117 |
| 2020/0211709 A1 * | 7/2020 | Devesa | G16H 40/20 |
| 2020/0312457 A1 * | 10/2020 | Kasthurirathne | G16H 10/60 |
| 2021/0027896 A1 * | 1/2021 | Eun | G16H 50/50 |
| 2021/0401295 A1 * | 12/2021 | Zhi | G06N 3/04 |
| 2021/0407667 A1 * | 12/2021 | Zhi | G16H 50/20 |
| 2022/0093252 A1 * | 3/2022 | Molony | G16H 70/60 |
| 2022/0093255 A1 * | 3/2022 | Molony | G06N 5/022 |
| 2023/0215519 A1 * | 7/2023 | Ho | G16H 10/60 |
| | | | 705/2 |
| 2023/0307127 A1 * | 9/2023 | Zhi | G16H 10/60 |
| 2024/0045994 A1 * | 2/2024 | Sun | G16H 50/70 |
| 2024/0362956 A1 * | 10/2024 | Smith | G06Q 10/20 |
| 2024/0371480 A1 * | 11/2024 | Frieder | G16H 10/60 |
| 2024/0404655 A1 * | 12/2024 | Bell | G16H 50/20 |
| 2024/0404685 A1 * | 12/2024 | Bell | G16H 50/30 |
| 2024/0404686 A1 * | 12/2024 | Colley | G06F 40/30 |
| 2024/0404687 A1 * | 12/2024 | Bell | G06Q 10/0633 |
| 2024/0404701 A1 * | 12/2024 | Bell | H04L 63/083 |
| 2024/0404702 A1 * | 12/2024 | Bell | G16H 15/00 |
| 2024/0404703 A1 * | 12/2024 | Colley | G06F 8/34 |
| 2024/0404712 A1 * | 12/2024 | Bell | G06N 3/045 |
| 2024/0406166 A1 * | 12/2024 | Bell | G06N 3/045 |
| 2025/0014748 A1 * | 1/2025 | Wu | G16H 50/20 |
| 2025/0045838 A1 * | 2/2025 | Kanithi | G16H 10/60 |
| 2025/0046406 A1 * | 2/2025 | Kanithi | G16H 40/20 |
| 2025/0062035 A1 * | 2/2025 | Masood | G16H 50/20 |
| 2025/0095860 A1 * | 3/2025 | Allen | G16H 50/20 |
| 2025/0118437 A1 * | 4/2025 | Molony | G16H 10/60 |
| 2025/0166803 A1 * | 5/2025 | Zhang | G16H 50/20 |

* cited by examiner

METHODS, SYSTEMS, AND COMPUTER PROGRAM PRODUCTS FOR SELECTING CRITERIA SUBSETS FOR PERFORMING A MEDICAL NECESSITY REVIEW FOR A PATIENT CARE PLAN

FIELD

The present inventive concepts relate generally to health care systems and services and, more particularly, medical necessity reviews, which are performed for determining the appropriateness of care plans for patients.

BACKGROUND

As part of a workflow for administering care to patients, health care service providers must determine if a treatment plan for is clinically justified. InterQual® criteria are a screening tool that may be used by providers to determine if the proposed services are clinically indicated and provided in the appropriate level of care. The InterQual criteria, however, are broken down into numerous medical necessity categories with several of the categories including numerous subsets of criteria. Case managers may use a tool to assist them in creating medical necessity reviews or a patient; however, even with the help of the tool the medical necessity review process can be difficult. For example, in scenarios where an admission diagnosis is not present, a case manager typically is required to create a manual medical review for the admission, which can be time consuming and may be prone to errors. In scenarios where multiple encounter diagnoses are present, the tool may create an automated medical necessity review for each encounter diagnosis, which may overwhelm the case manager as the case manager needs to evaluate multiple potential medical necessity reviews and complete the appropriate one(s). Moreover, it may be difficult for a case manager using the tool to determine which of the many subsets of InterQual criteria to select for performing the medical necessity review.

SUMMARY

According to some embodiments of the inventive concept, a method comprises: receiving input information associated with a health record of a patient, the input information comprising information associated with a plurality of input variables; embedding the information associated with the plurality of variable to generate a plurality of input variable vectors, respectively; aggregating the plurality of input variable vectors to generate a patient health record vector; generating, using a knowledge graph, a first ranking of a plurality of subsets of criteria used for determining an appropriateness of a care plan for the patient based on the patient health record vector; generating, using an artificial intelligence engine, a second ranking of the plurality of subsets of the criteria used for determining the appropriateness of the care plan for the patient based on the patient health record vector; and generating a final ranking of the plurality of subsets of the criteria used for determining the appropriateness of the care plan for the patient based on the first ranking and the second ranking.

In other embodiments, the plurality of input variables comprise encounter diagnoses, medications, lab tests, and procedures.

In still other embodiments, the nodes of the knowledge graph comprise the plurality of input variables and the plurality of subsets.

In still other embodiments, the method further comprises: embedding the plurality of subsets of the criteria used for determining the appropriateness of the care plan for the patient to generate a plurality of subset vectors, respectively; wherein generating, using the knowledge graph, the first ranking of the plurality of subsets comprises: generating a plurality of similarity scores between the patient health record vector and the plurality of subset vectors, respectively.

In still other embodiments, generating the plurality of similarity scores comprises: generating a plurality of cosine similarity scores between the patient health record vector and the plurality of subset vectors, respectively.

In still other embodiments, the artificial intelligence engine comprises a multi-layer neural network, the method further comprising: assigning the plurality of input variables to nodes of an input layer of the multi-layer neural network, respectively; and assigning the plurality of subsets of the criteria used for determining the appropriateness of the care plan for the patient to an output layer of the multi-layer neural network, respectively.

In still other embodiments, the method further comprises: initializing the nodes of the input layer of the multi-layer neural network with the plurality of input variable vectors; embedding the plurality of subsets of the criteria used for determining the appropriateness of the care plan for the patient to generate a plurality of subset vectors, respectively; and initializing the nodes of the output layer of the multi-layer neural network with the plurality of subset vectors; wherein generating, using the artificial intelligence engine, the second ranking of the plurality of subsets comprises: aggregating the plurality of subset vectors to generate an aggregated subset vector; and generating, using the multi-layer neural network, a similarity score between the patient health record vector and the aggregated subset vector.

In still other embodiments, generating, using the multi-layer neural network, the similarity score comprises: generating a plurality of similarity scores between the patient health record vector and the plurality of subset vectors, respectively.

In still other embodiments, generating the plurality of similarity scores comprises: generating a plurality of cosine similarity scores between the patient health record vector and the plurality of subset vectors, respectively.

In still other embodiments, the first ranking comprises a first plurality of confidence scores for the plurality of subsets; and the second ranking comprises a second plurality of confidence scores for the plurality of subsets; wherein the method further comprises: aggregating the first plurality of confidence scores with the second plurality of confidence scores to generate a plurality of aggregated confidence scores; and normalizing the aggregated confidence scores to generate normalized aggregated confidence scores.

In still other embodiments, aggregating the plurality of confidence scores comprises determining a weighted average of the confidence score from the first ranking and the confidence score from the second ranking for each of the plurality of subsets.

In still other embodiments, generating the final ranking comprises generating the final ranking of the plurality of subsets of the criteria used for determining the appropriateness of the care plan for the patient based on the normalized aggregated confidence scores.

In some embodiments of the inventive concept, a system comprises: a processor; and a memory coupled to the processor and comprising computer readable program code embodied in the memory that is executable by the processor to perform operations comprising: receiving input information associated with a health record of a patient, the input information comprising information associated with a plurality of input variables; embedding the information associated with the plurality of variable to generate a plurality of input variable vectors, respectively; aggregating the plurality of input variable vectors to generate a patient health record vector; generating, using a knowledge graph, a first ranking of a plurality of subsets of criteria used for determining an appropriateness of a care plan for the patient based on the patient health record vector; generating, using an artificial intelligence engine, a second ranking of the plurality of subsets of the criteria used for determining the appropriateness of the care plan for the patient based on the patient health record vector; and generating a final ranking of the plurality of subsets of the criteria used for determining the appropriateness of the care plan for the patient based on the first ranking and the second ranking.

In further embodiments, the artificial intelligence engine comprises a multi-layer neural network, the operations further comprising: assigning the plurality of input variables to nodes of an input layer of the multi-layer neural network, respectively; and assigning the plurality of subsets of the criteria used for determining the appropriateness of the care plan for the patient to an output layer of the multi-layer neural network, respectively.

In still further embodiments, the operations further comprise: initializing the nodes of the input layer of the multi-layer neural network with the plurality of input variable vectors; embedding the plurality of subsets of the criteria used for determining the appropriateness of the care plan for the patient to generate a plurality of subset vectors, respectively; and initializing the nodes of the output layer of the multi-layer neural network with the plurality of subset vectors; wherein generating, using the artificial intelligence engine, the second ranking of the plurality of subsets comprises: aggregating the plurality of subset vectors to generate an aggregated subset vector; and generating, using the multi-layer neural network, a similarity score between the patient health record vector and the aggregated subset vector.

In still further embodiments, the first ranking comprises a first plurality of confidence scores for the plurality of subsets; and the second ranking comprises a second plurality of confidence scores for the plurality of subsets; wherein the operations further comprise: aggregating the first plurality of confidence scores with the second plurality of confidence scores to generate a plurality of aggregated confidence scores; and normalizing the aggregated confidence scores to generate normalized aggregated confidence scores.

In some embodiments of the inventive concept, a computer program product comprises: a non-transitory computer readable storage medium comprising computer readable program code embodied in the medium that is executable by a processor to perform operations comprising: receiving input information associated with a health record of a patient, the input information comprising information associated with a plurality of input variables; embedding the information associated with the plurality of variable to generate a plurality of input variable vectors, respectively; aggregating the plurality of input variable vectors to generate a patient health record vector; generating, using a knowledge graph, a first ranking of a plurality of subsets of criteria used for determining an appropriateness of a care plan for the patient based on the patient health record vector; generating, using an artificial intelligence engine, a second ranking of the plurality of subsets of the criteria used for determining the appropriateness of the care plan for the patient based on the patient health record vector; and generating a final ranking of the plurality of subsets of the criteria used for determining the appropriateness of the care plan for the patient based on the first ranking and the second ranking.

In other embodiments, the artificial intelligence engine comprises a multi-layer neural network, the operations further comprising: assigning the plurality of input variables to nodes of an input layer of the multi-layer neural network, respectively; and assigning the plurality of subsets of the criteria used for determining the appropriateness of the care plan for the patient to an output layer of the multi-layer neural network, respectively.

In still other embodiments, the operations further comprise: initializing the nodes of the input layer of the multi-layer neural network with the plurality of input variable vectors; embedding the plurality of subsets of the criteria used for determining the appropriateness of the care plan for the patient to generate a plurality of subset vectors, respectively; and initializing the nodes of the output layer of the multi-layer neural network with the plurality of subset vectors; wherein generating, using the artificial intelligence engine, the second ranking of the plurality of subsets comprises: aggregating the plurality of subset vectors to generate an aggregated subset vector; and generating, using the multi-layer neural network, a similarity score between the patient health record vector and the aggregated subset vector.

In still other embodiments, the first ranking comprises a first plurality of confidence scores for the plurality of subsets; and the second ranking comprises a second plurality of confidence scores for the plurality of subsets; wherein the operations further comprise: aggregating the first plurality of confidence scores with the second plurality of confidence scores to generate a plurality of aggregated confidence scores; and normalizing the aggregated confidence scores to generate normalized aggregated confidence scores.

Other methods, systems, articles of manufacture, and/or computer program products according to embodiments of the inventive concept will be or become apparent to one with skill in the art upon review of the following drawings and detailed description. It is intended that all such additional systems, methods, articles of manufacture, and/or computer program products be included within this description, be within the scope of the present inventive subject matter and be protected by the accompanying claims.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth to provide a thorough understanding of embodiments of the inventive concept. However, it will be understood by those skilled in the art that embodiments of the inventive concept may be practiced without these specific details. In some instances, well-known methods, procedures, components, and circuits have not been described in detail so as not to obscure the inventive concept. It is intended that all embodiments disclosed herein can be implemented separately or combined in any way and/or combination. Aspects described with respect to one embodiment may be incorporated in different embodiments although not specifically described relative thereto. That is, all embodiments and/or features of any embodiments can be combined in any way and/or combination.

As used herein, the term "provider" may mean any person or entity involved in providing health care products and/or services to a patient.

As used herein, the term "medical indication" refers to a valid reason to order a treatment or procedure, such as, but not limited to, a test, surgery, medication, and medical device. There can be multiple medical indications to order or use a particular treatment or procedure.

Embodiments of the inventive concept are described herein in the context of a hybrid system for selecting one or more subsets of criteria used for determining the appropriateness of a care plan for a patient based on the patient's medical record. The hybrid system may include a knowledge graph and an Artificial Intelligence (AI) engine, which uses multi-layer neural network technology. The embodiments of the system for selecting subsets of criteria for a medical necessity review are described with respect to the use of one or more multi-layer neural network systems. It will be understood, however, that embodiments of the inventive concept are not limited to multi-layer neural network implementations of the medical necessity review criteria selection system and that other types of AI systems may be used including, but not limited to, a machine learning system, a deep learning system, a natural language processing system, and/or computer vision system. Moreover, it will be understood that the multi-layer neural network is a multi-layer artificial neural network comprising artificial neurons or nodes and does not include a biological neural network comprising real biological neurons. Both the AI engine and knowledge graph described herein may be configured to transform a memory of a computer system to include one or more data structures, such as, but not limited to, arrays, extensible arrays, linked lists, binary trees, balanced trees, heaps, stacks, and/or queues. These data structures can be configured or modified through the AI training process and/or the knowledge graph initialization or training process to improve the efficiency of a computer system when the computer system operates in an inference mode to make an inference, prediction, classification, suggestion, or the like with respect to selection of a one or more subsets of criteria used for medical necessity review in response to input information or data provided thereto.

Some embodiments of the inventive concept stem from a realization that it can be difficult for a case manager for select one or more subsets of criteria for use in determining the appropriateness of a care plan for a patient as part of a medical necessity review. For example, the InterQual criteria may have close to one-hundred subsets of criteria spanning multiple medical necessity categories. Selection of the appropriate medical necessity review criteria can be further complicated as a patient may present with no admission diagnosis, which may require more manual intervention in the review for that admission, or the patient may present with multiple encounter diagnoses, which can be overwhelming to the case manager in deciding which diagnoses should be used as a basis for a medical necessity review. Some embodiments of the inventive concept may provide a hybrid medical necessity review criteria selection system that uses both an AI engine and a knowledge graph to rank the review criteria subsets, such as the InterQual criteria subsets, based on a patient's medical record. The information input to the medical necessity review criteria selection system may include medical record information, such as encounter diagnoses, medications, lab tests, and procedures. This information may be embedded and aggregated to create a patient health care record vector. Both the knowledge graph and the AI engine may be used to generate a ranking of the plurality of subsets of criteria used for determining the appropriateness of the care plan for the patient based on the patient health record vector. A final ranking of the subsets may be generated, for example, by averaging the rankings from the from the AI engine and the knowledge graph or determining a weighted average of the rankings from the AI engine and the knowledge graph. By using two different systems—the knowledge graph and the AI engine—to rank the subsets of criteria used for determining the appropriateness of the care plan for the patient, the most relevant subsets can be selected with greater accuracy than if the knowledge graph or AI engine were used alone.

Figure 1:
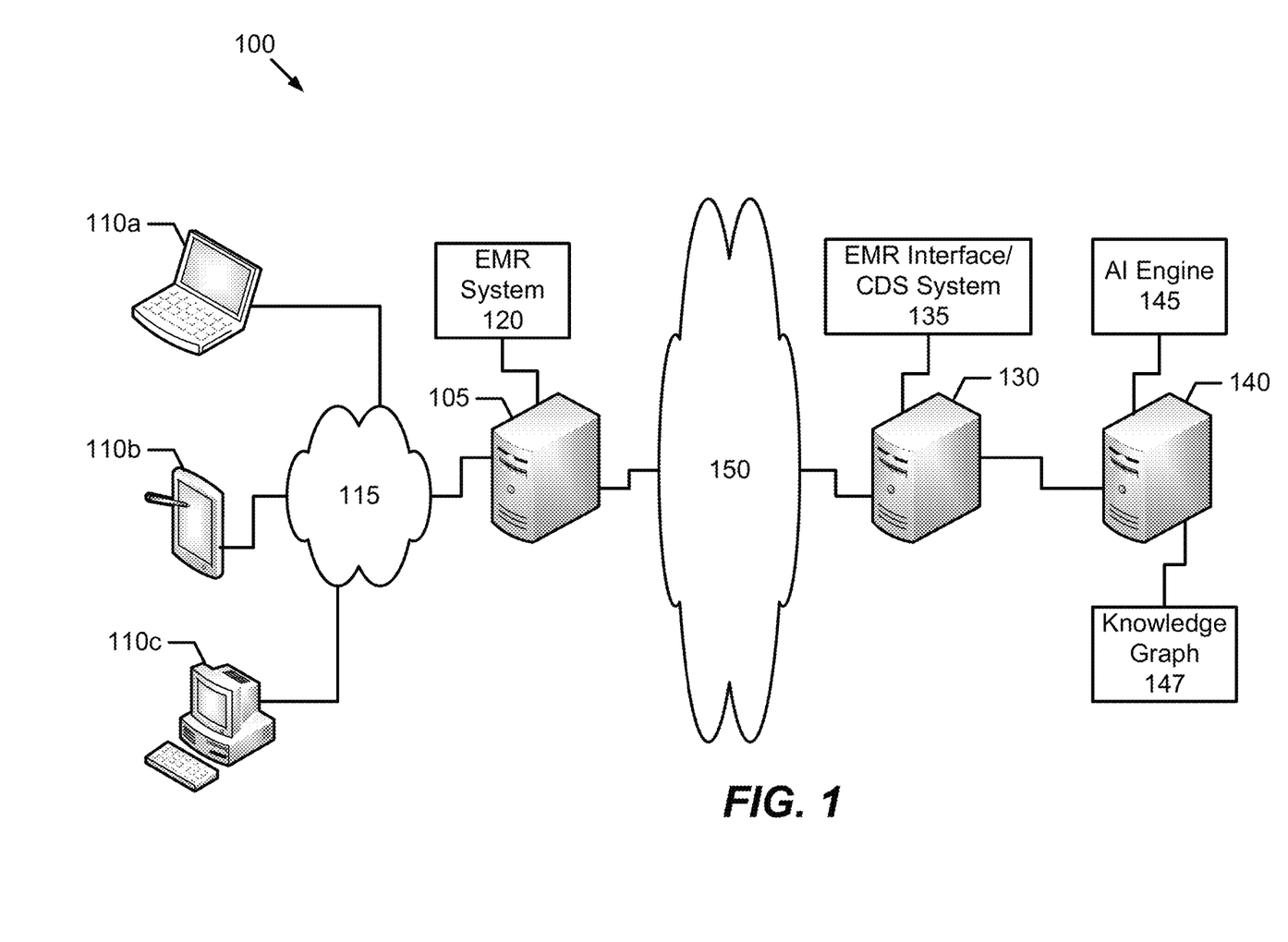
FIG. 1 is a block diagram that illustrates a communication network including a hybrid system for selecting criteria subsets for use in a medical necessity review in accordance with some embodiments of the inventive concept.

Referring to FIG. 1, a communication network 100 including a system for selecting criteria subsets for use in a medical necessity review, in accordance with some embodiments of the inventive concept, comprises a health care facility server 105 that is coupled to devices 110a, 110b, and 110c via a network 115. The health care facility may be any type of health care or medical facility, such as a hospital, doctor's office, specialty center (e.g., surgical center, orthopedic center, laboratory center etc.), or the like. The health care facility server 105 may be configured with an Electronic Medical Record (EMR) system module 120 to manage patient files and facilitate the entry of orders for patients via health care service providers ("providers"). Although shown as one combined system in FIG. 1, it will be understood that some health care facilities use separate systems for electronic medical record management and order entry management. The providers may use devices, such as devices 110a, 110b, and 110c to manage patients' electronic records and to issue orders for the patients through the EMR system 120. An order may include, but is not limited to, a treatment, a procedure (e.g., surgical procedure, physical therapy procedure, radiologic/imaging procedure, etc.) a test, a prescription, and the like. The network 115 communicatively couples the devices 110a, 110b, and 110c to the health care facility server 105. The network 115 may comprise one or more local or wireless networks to communicate with the health care facility server 105 when the health care facility server 105 is located in or proximate to the health care facility. When the health care facility server 105 is in a remote location from the health care facility, such as part of a cloud computing system or at a central computing center, then the network 115 may include one or more wide area or global networks, such as the Internet.

According to some embodiments of the inventive concept, providers may access a system for selecting criteria subsets for use in a medical necessity review. The system may be a hybrid system including both an AI engine and a knowledge graph. The hybrid system may include a health care facility interface server 130, which includes an EMR interface/clinical decision support (CDS) system module 135 to facilitate the transfer of information between the EMR system 120, which the providers use to manage patient records and issue orders, and a hybrid server 140, which includes an AI engine module 145 and a knowledge graph module 147. The hybrid server 140, AI engine module 145, and knowledge graph module 147 may be configured to receive patient information contained in records in the EMR system 120 from the health care facility server 105 and EMR system module 120 by way of the health care facility interface server 130 and EMR interface/CDS system module 135. The EMR interface/CDS system module 135 in conjunction with the AI engine module 145 and knowledge graph module 147 may be further configured to generate rankings of criteria subsets for use in a medical necessity review in accordance with some embodiments of the inventive concept. It will be understood that the division of functionality described herein between the hybrid server 140/AI engine module 145 and knowledge graph module 147 and the health care facility interface server 130/EMR interface/CDS system module 135 is an example. Various functionality and capabilities can be moved between the hybrid server 140/AI engine module 145 and knowledge graph module 147 and the health care facility interface server 130/EMR interface/CDS system module 135 in accordance with different embodiments of the inventive concept. Moreover, in some embodiments, the hybrid server 140/AI engine module 145 and knowledge graph module 147 and the health care facility interface server 130/EMR interface/CDS system module 135 may be merged as a single logical and/or physical entity.

A network 150 couples the health care facility server 105 to the health care facility interface server 130. The network 150 may be a global network, such as the Internet or other publicly accessible network. Various elements of the network 150 may be interconnected by a wide area network, a local area network, an Intranet, and/or other private network, which may not be accessible by the general public. Thus, the communication network 150 may represent a combination of public and private networks or a virtual private network (VPN). The network 150 may be a wireless network, a wireline network, or may be a combination of both wireless and wireline networks.

The service provided through the health care facility interface server 130, EMR interface/CDS system module 135, hybrid server 140/AI engine module 145 and knowledge graph module 147 to provide medical necessity review criteria selection support may, in some embodiments, be embodied as a cloud service. For example, health care facilities may integrate their EMR systems/order systems with the medical necessity review criteria selection support service and access the service as a Web service. In some embodiments, the medical necessity review criteria selection support service may be implemented as a Representational State Transfer Web Service (RESTful Web service).

Although FIG. 1 illustrates an example communication network including a medical necessity review criteria selection system, it will be understood that embodiments of the inventive subject matter are not limited to such configurations, but are intended to encompass any configuration capable of carrying out the operations described herein.

Figure 2:
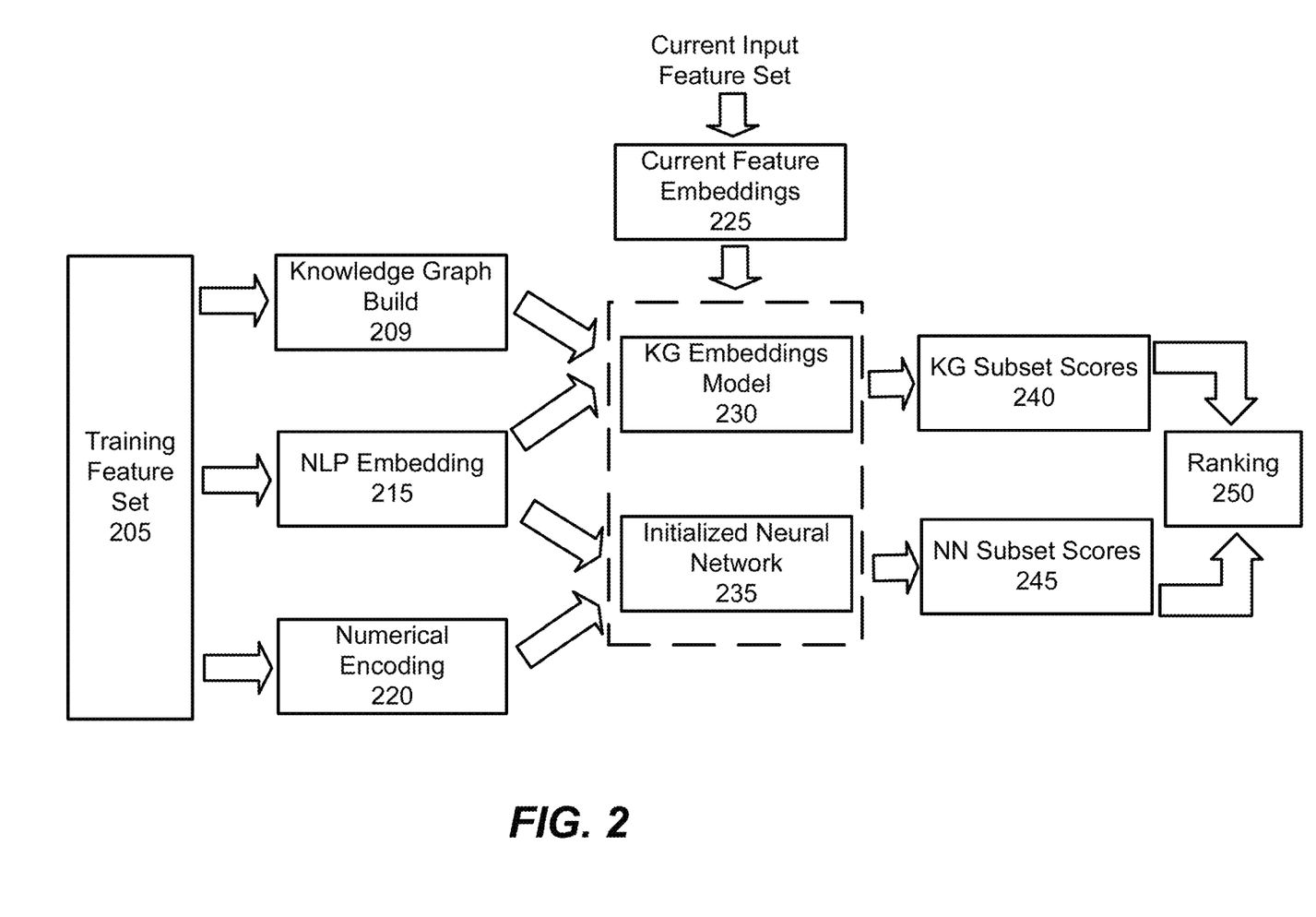
FIG. 2 is a block diagram of the hybrid system of FIG. 1 in accordance with some embodiments of the inventive concept.

FIG. 2 is a block diagram of an AI engine and knowledge graph used in the medical necessity review criteria selection system of FIG. 1 in accordance with some embodiments of the inventive concept. As shown in FIG. 2, a training feature set 205 for training and/or initializing the AI engine and the knowledge graph may include information associated with a plurality of input variables, which include, but are not limited to, encounter diagnoses, medications, lab tests, and procedures. A knowledge graph build 209 may be generated in which the nodes in the knowledge graph correspond to the plurality of input variables along with the subsets of the criteria used for determining the appropriateness of the care plan for the patient, i.e., the criteria used in a medical necessity review. The subsets may be, for example, subsets of the InterQual criteria in some embodiments. A Natural Language Processing (NLP) embedding module 215 may be used to create embeddings for the input variables contained in the input feature set 205 along with the criteria subsets, which, in conjunction with the knowledge graph build module 209 may be used to generate a knowledge graph embeddings model 230 with the nodes of the graph defined and the edges initialized/trained based on the embeddings provided by the NLP embedding module 215. An embedding is a learned continuous vector representation of a discrete variable. These input variables from the training feature set 205 may be categorical or discrete variables for which a continuous vector is generated. Similarly, the multilayer neural network 235 is initialized or trained using the embeddings provided by the NLP embedding module 215 and the numerical encoding module 220, which may be used to create embeddings for lab test information, for example.

Figure 3:
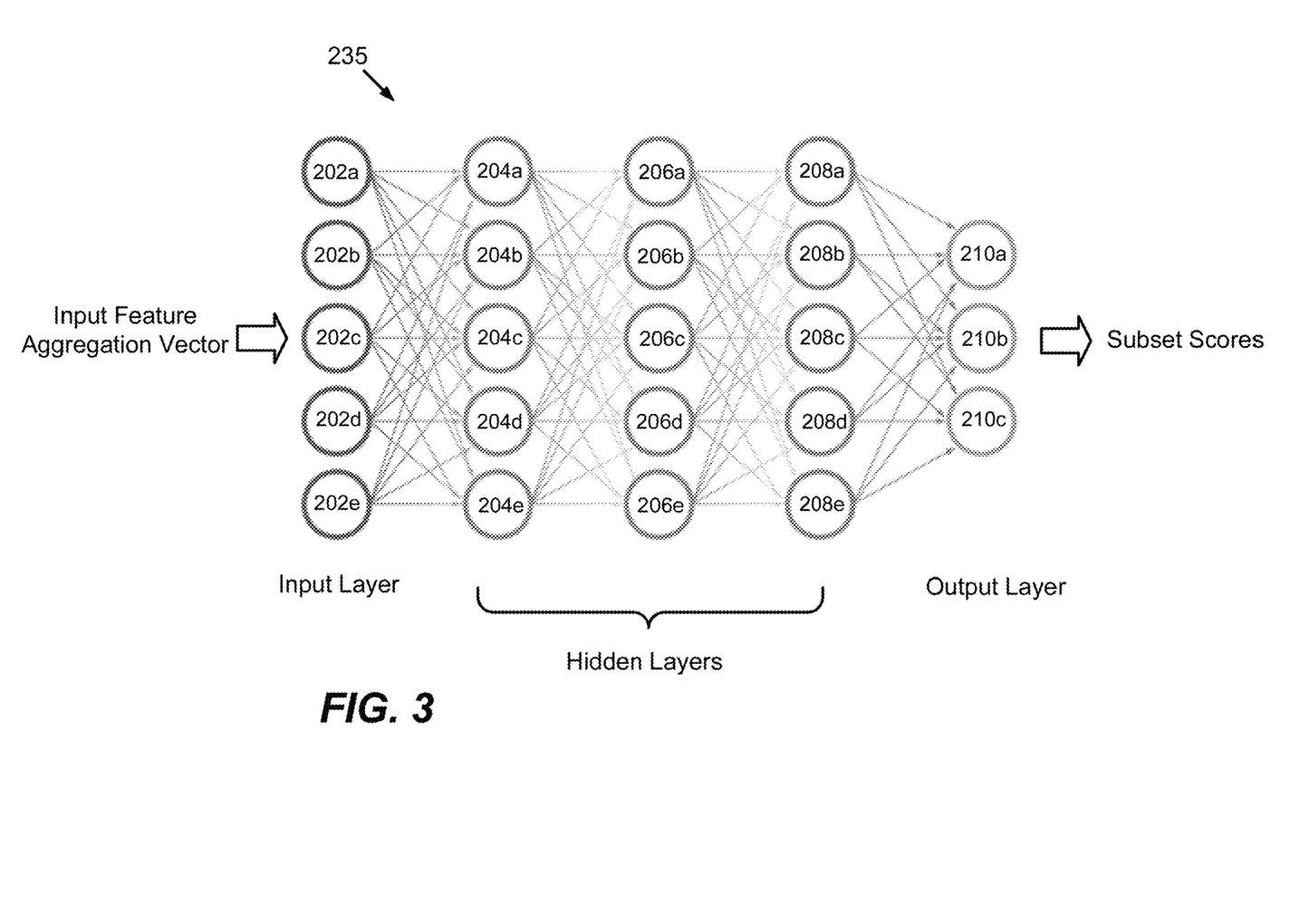
FIG. 3 is a block diagram of a neural network used in the AI engine of FIGS. 1 and 2 in accordance with some embodiments of the inventive concept.

FIG. 3 is a diagram of an initialized artificial neural network system 235 according to some embodiments of the inventive concept. As shown in FIG. 3, the artificial neural network 235 includes a plurality of node layers comprising an input layer, one or more hidden layers, and an output layer. In the example shown in FIG. 3, an input layer comprises five nodes or neurons 202a, 202b, 202c, 202d, and 202e and an output layer comprises three nodes or neurons 210a, 210b, and 210c. In the example shown, three hidden layers connect the input layer to the output layer including a first hidden layer comprising five nodes or neurons 204a, 204b, 204c, 204d, and 204e, a second hidden layer comprising five nodes or neurons 206a, 206b, 206c, 206d, and 206e, and a third hidden layer comprising five nodes or neurons 208a, 208b, 208c, 208d, and 208e. Other embodiments may use more or fewer hidden layers. Each node or neuron connects to another and has an associated weight and threshold. If the output of any individual node or neuron is above the specified threshold value, that node is activated, sending data to the next layer of the network. Otherwise, no data is passed along to the next layer of the network.

The number of nodes in the input layer 202a, 202b, 202c, 202d, and 202e may correspond to the number of variables in the training feature set 205 during training and the current input feature set during inference model. In aggregate, the embedded vectors corresponding to the plurality of input variables may be viewed as a patient health record vector.

The number of nodes in the output layer 210a, 210b, and 210c may correspond to the number of different criteria subsets for use in a medical necessity review that are scored/ranked using the neural network 235. While only three nodes 210a, 210b, and 210c are shown in FIG. 3, the number of output layer nodes would typically be much greater due to the large number of criteria subsets that are defined for performing medical necessity reviews. In aggregate, the embedded vectors of the different criteria subsets may be viewed as an aggregated subset vector.

As described above, the artificial neural network 235 relies on training data to learn and improve its accuracy over time. The neural network 235 may be trained to score criteria subsets for use in a medical necessity review based on input information associated with a patient's medical record. Historical patient medical records may be used in the training, knowledge base, and/or vocabulary for the neural network 235, the NLP embedding module 215, and the numerical encoding module 220. Once the various parameters of the neural network system 235 are tuned and refined for accuracy, it can be used, among other applications, to generate inferences or scores for criteria subsets for use in a medical necessity review in response to input data associated with a patient, including free-text queries. Such a neural network 235 may also be trained to perform other tasks, such as, but not limited to, classify images, recognize and interpret speech, and cluster data, amongst other uses.

Each individual node or neuron may be viewed as implementing a linear regression model, which is composed of input data, weights, a bias (or threshold), and an output. Once an input layer is determined, weights are assigned. These weights help determine the importance of any given variable, with larger ones contributing more significantly to the output compared to other inputs. All inputs are then multiplied by their respective weights and then summed, i.e., a MAC operation. In FIG. 3, node or neuron 206a, for example, receives inputs corresponding to the outputs of nodes or neurons 204a, 204b, 204c, 204d, and 204e. These inputs are multiplied by their corresponding weights and summed at node or neuron 206a. Afterward, the output is passed through an activation function, which determines the output. If that output exceeds a given threshold, it activates the node by passing data to the next layer in the network. This results in the output of one node becoming in the input of the next node. This process of passing data from one layer to the next layer is an example of a feedforward artificial neural network. Some embodiments of the inventive concept may provide a rectified linear unit (ReLU) activation function for use at one or more of the neural network 235 nodes.

Returning to FIG. 2, once the knowledge graph model 230 and multi-layer neural network 235 are trained, the knowledge graph 230 and neural network 235 may operate in inference mode based on a current input feature set for a current patient. The current input feature set may include information associated with one or more of the plurality of input variables used in the training feature set 205. The current feature set are embedded into a plurality of input variable vectors using the current feature embeddings module 225, which are then aggregated to provide a patient health record vector. The knowledge graph 230 and the multi-layer neural network 235 may then process the patient health record vector to generate confidence scores for the different criteria subsets for use in a medical necessity review as shown, which are represented by the knowledge graph subset confidence scores 240 and the neural network subset confidence scores 245. These confidence scores 240 and 245 may be termed similarity scores, which may be indicative of a similarity between the patient health record vector, which comprises an aggregation of the input variable vectors, and the aggregated subset vector, which is the aggregation of the vectors associated with the criteria subsets. The individual similarity scores may be based on the similarity between the patient health record vector and the individual medical criteria subset vectors from, for example, the output layer 210a, 210b, 210c of the multi-layer neural network 235. In some embodiments, cosine similarity score (s) may be generated between the patient health record vector and the aggregated subset vector and may be used to rank the various criteria subsets in terms based on their probability of being relevant or applicable to the input information from the patient's medical record, i.e., the information associated with the input variables.

Figure 4:
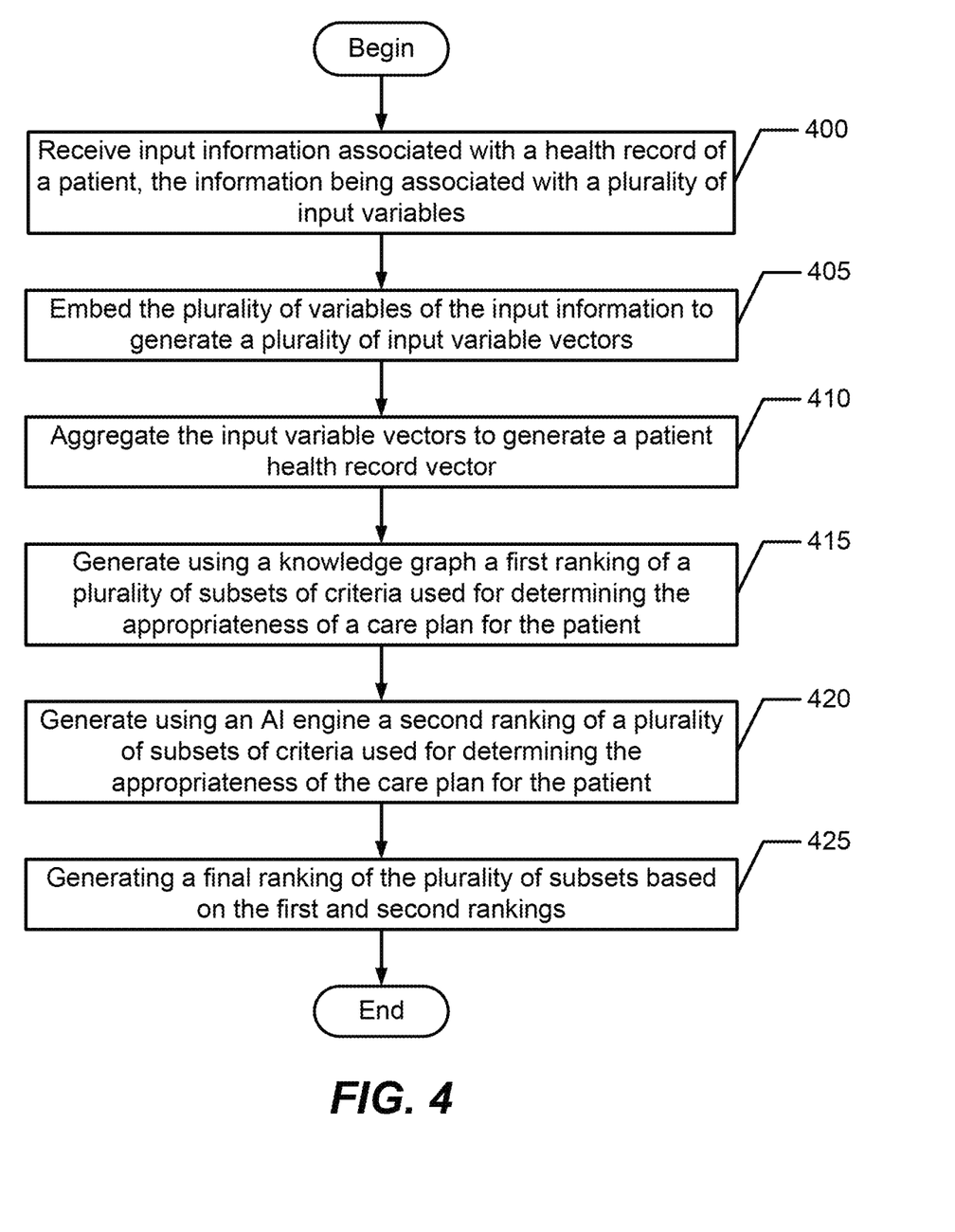
FIGS. 4-6 are flowcharts that illustrate operations for selecting criteria subsets for performing a medical necessity review using the hybrid system of FIGS. 1 and 2 in accordance with some embodiments of the inventive concept.
Figure 5:
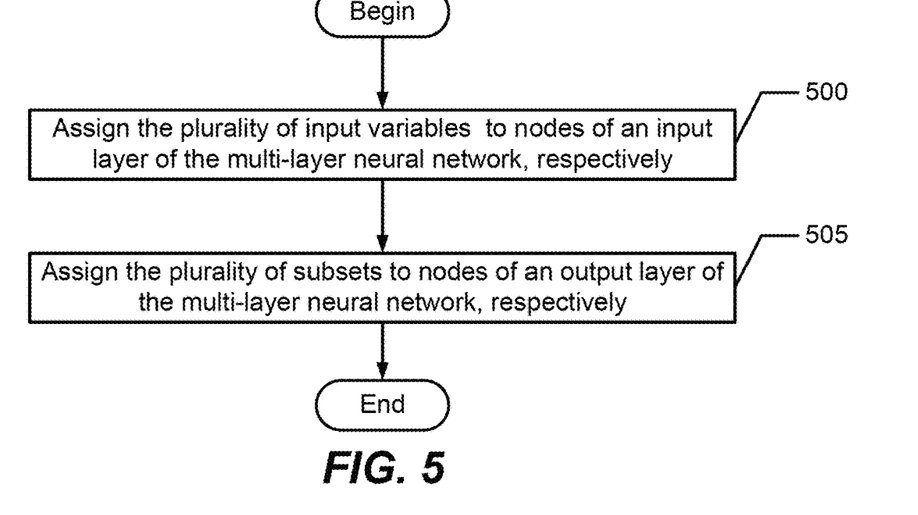
Figure 6:
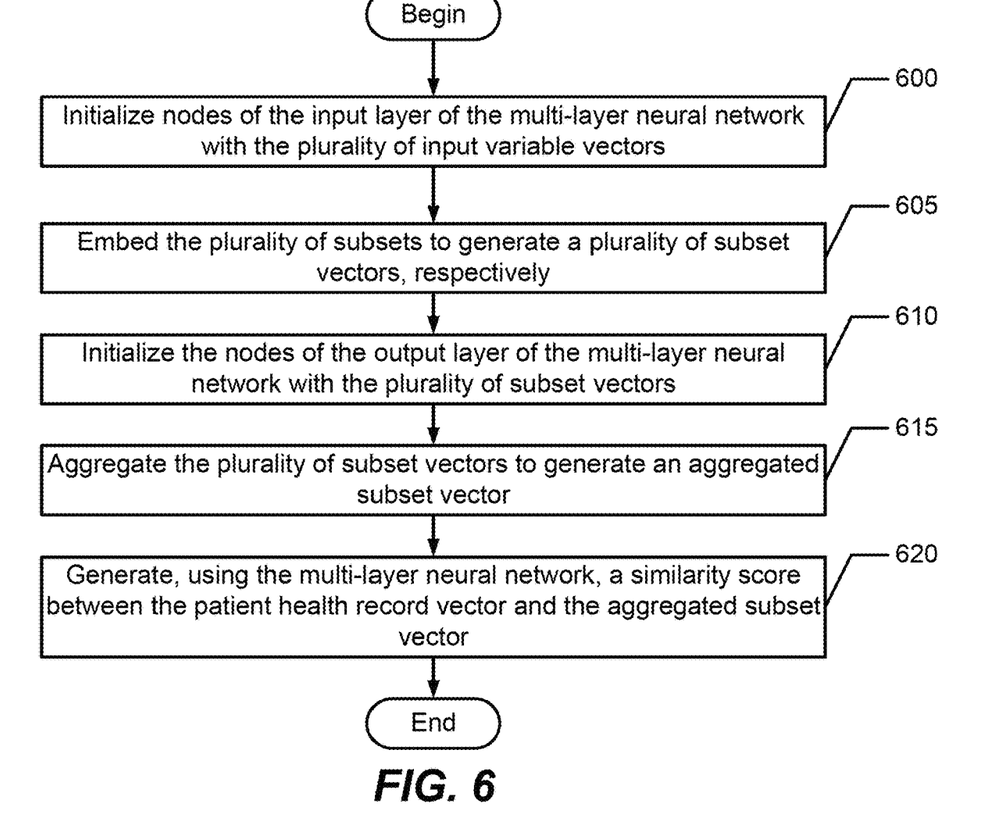

FIGS. 4-6 are flowcharts that illustrate operations of the medical necessity review selection system of FIG. 1 in accordance with some embodiments of the inventive concept. Referring now to FIG. 4, operations begin at block 400 where input information associated with a health record of a patient is received. This information is associated with a plurality of input variables. The information may be, for example, one or more input variable values for the input variables the training feature set 205 described above, which may correspond to the current input feature set of FIG. 2. The input information associated with the plurality of variables may be embedded using the current feature embeddings module 225 to generate a plurality of input variable vectors, respectively, at block 405. The plurality of input variable vectors may be aggregated to generate a patient health record vector at block 410. A knowledge graph is used to generate a first ranking of a plurality of subsets of criteria for determining the appropriateness of a care plan for the patient at block 415. In some embodiments, the first ranking may be based on similarity scores between the patient health record vector and a plurality of subset vectors corresponding to the different criteria subsets used in a medical necessity review. The similarity scores may be cosine similarity scores between the patient health record vector and the plurality of subset vectors, respectively. At block 420, a second ranking of the plurality of subsets of criteria used for determining the appropriateness of the care plan for the patient may be generated using an AI engine, such as, for example, a multi-layer neural network 235.

Referring now to FIG. 5, example operations of the neural network 235 begin at block 500 where the plurality of input variables are assigned to the input layer nodes of the neural network 235. The plurality of criteria subsets for use in a medical necessity review is assigned to nodes of the output layer of the neural network 235 at block 505. Referring now to FIG. 6, the nodes of the input layer of the neural network 235 are initialized with the plurality of input variable vectors at block 600. The plurality of criteria subsets is embedded using, for example, the natural language processing module 215, at block 605 to generate a plurality of subset vectors, respectively. The nodes of the output layer of the neural network 235 are initialized with the plurality of subset vectors, respectively, at block 610. The plurality of subset vectors is aggregated to generate an aggregated subset vector at block 615. A similarity score between the patient health record vector and the aggregated subset vector may be generated at block 620 using the neural network 235. The similarity score may be, for example, a cosine similarity score in some embodiments of the inventive concept. Similar to the knowledge graph 230, a plurality of similarity scores may be generated between the patient health record vector and the individual subset vectors, which are indicative of the probability that the subset criteria are relevant or applicable to the patient's health record when performing a medical necessity review as part of forming a care plan for the patient.

Returning to FIG. 4, a final ranking of the plurality of criteria subsets is generated at block 425 based on the first and second similarity or confidence scores provided by the knowledge graph 230 and the multi-layer neural network 235, respectively. The final ranking may be generated by aggregating the first and second similarity or confidence scores and then normalizing these aggregated scores. In some embodiments, the scores may be aggregated by determining an average or weighted average of the two scores (knowledge graph score and neural network score) for each individual criteria subset. These scores may define a final ranking of the applicability of the criteria subsets in performing a medical necessity review for the patient. A case manager may select one or more of the higher ranked, for example, criteria subsets in performing a medical necessity review to determine the appropriateness of the care plan for the patient.

Figure 7:
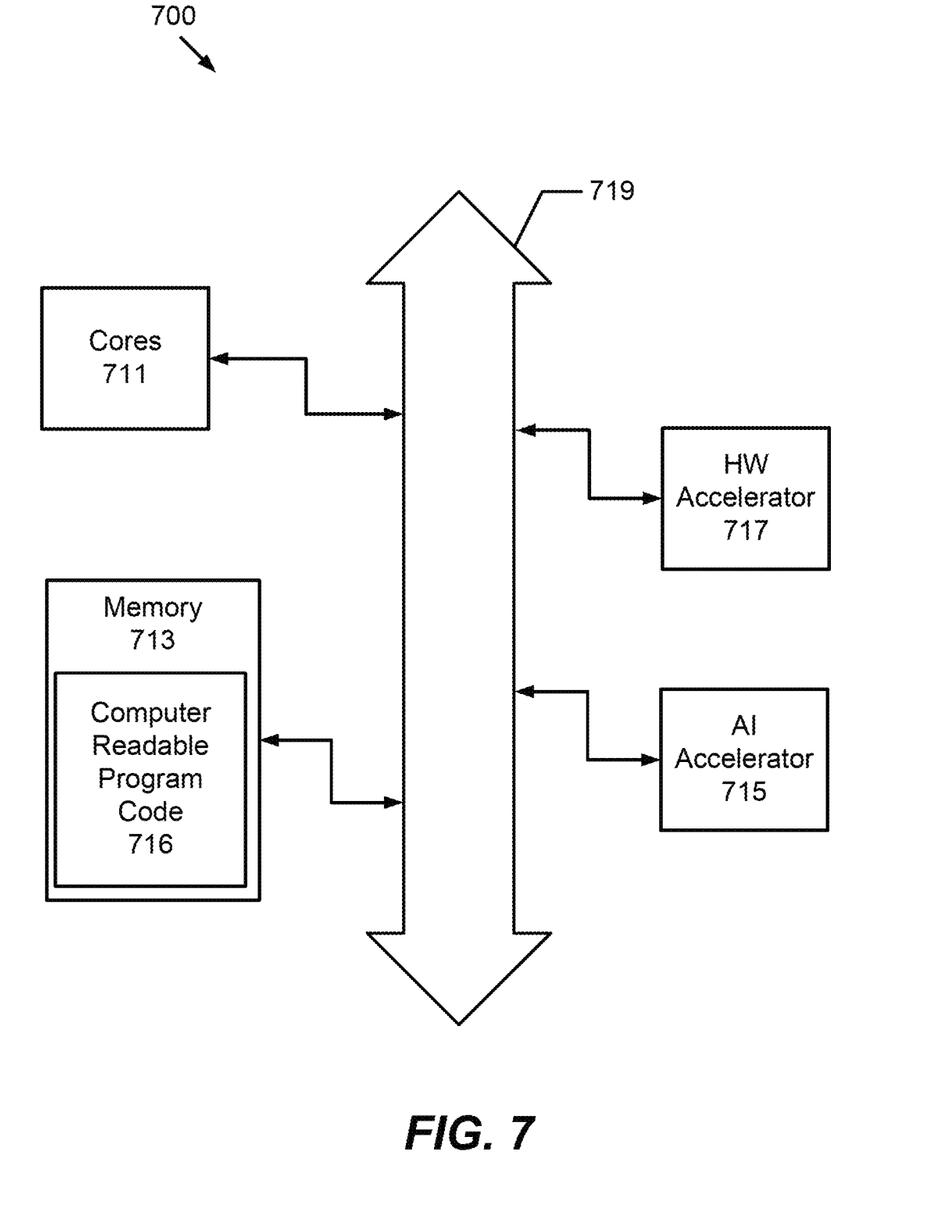
FIG. 7 is a data processing system that may be used to implement a medical necessity review criteria selection system in accordance with some embodiments of the inventive concept.

FIG. 7 is a block diagram of a data processing system 700 that may be used to implement the hybrid server 140 of FIG. 1, in accordance with some embodiments of the inventive concept. As shown in FIG. 7, the data processing system 700 may include at least one core 711, a memory 713, an Artificial Intelligence (AI) accelerator 715, and a hardware (HW) accelerator 717. The at least one core 711, the memory 713, the AI accelerator 715, and the HW accelerator 717 may communicate with each other through a bus 719.

The at least one core 711 may be configured to execute computer program instructions. For example, the at least one core 711 may execute an operating system and/or applications represented by the computer readable program code 716 stored in the memory 713. In some embodiments, the at least one core 711 may be configured to instruct the AI accelerator 715 and/or the HW accelerator 717 to perform operations by executing the instructions and obtain results of the operations from the AI accelerator 715 and/or the HW accelerator 717. In some embodiments, the at least one core 711 may be an ASIP customized for specific purposes and support a dedicated instruction set.

The memory 713 may have an arbitrary structure configured to store data. For example, the memory 713 may include a volatile memory device, such as dynamic random-access memory (DRAM) and static RAM (SRAM), or include a non-volatile memory device, such as flash memory and resistive RAM (RRAM). The at least one core 711, the AI accelerator 715, and the HW accelerator 717 may store data in the memory 713 or read data from the memory 713 through the bus 719.

The AI accelerator 715 may refer to hardware designed for AI applications. In some embodiments, the AI accelerator 715 may include medical necessity review system functionality configured to provide a service for selecting one or more subsets of criteria used in determining the appropriateness of a care plan for a patient. The AI accelerator 715 may generate output data by processing input data provided from the at least one core 715 and/or the HW accelerator 717 and provide the output data to the at least one core 711 and/or the HW accelerator 717. In some embodiments, the AI accelerator 715 may be programmable and be programmed by the at least one core 711 and/or the HW accelerator 717. The HW accelerator 717 may include hardware designed to perform specific operations at high speed. The HW accelerator 717 may be programmable and be programmed by the at least one core 711.

Figure 8:
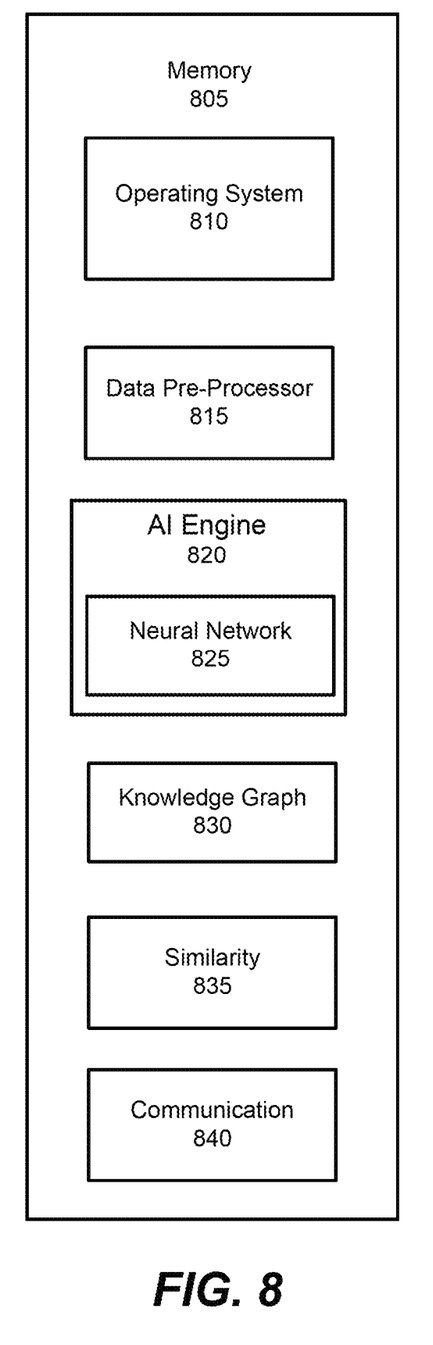
FIG. 8 is a block diagram that illustrates a software/hardware architecture for use in the hybrid system for selecting criteria subsets of FIG. 1 in accordance with some embodiments of the inventive concept.

FIG. 8 illustrates a memory 805 that may be used in embodiments of data processing systems, such as the hybrid server 140 of FIG. 1 and the data processing system 700 of FIG. 7, respectively, to facilitate operation of a system for selecting criteria subsets for use in a medical necessity review. The memory 805 is representative of the one or more memory devices containing the software and data used for facilitating operations of the hybrid server 140 as described herein. The memory 805 may include, but is not limited to, the following types of devices: cache, ROM, PROM, EPROM, EEPROM, flash, SRAM, and DRAM. As shown in FIG. 8, the memory 805 may contain six or more categories of software and/or data: an operating system 810, a data pre-processor module 815, an AI engine 820, a knowledge graph 830, a similarity module 835, and a communication module 840. In particular, the operating system 810 may manage the data processing system's software and/or hardware resources and may coordinate execution of programs by the processor.

The data pre-processor 815 may be configured to receive and organize the information corresponding to the input variables, e.g., the training feature set 205 and the current input feature set of FIG. 2 when the knowledge graph 230 and the neural network 235 are in training mode and when the knowledge graph 230 and the neural network 235 are in inference mode, respectively. The AI engine module 820 may comprise a neural network module 825. The neural network module 825 may be configured to perform one or more of the operations described above with respect to the neural network 235 and FIGS. 4-6. The knowledge graph module 830 may be configured to perform one or more of the operations described above with respect to the knowledge graph embedding model 230 and FIGS. 4-6. The similarity module 835 may be configured to implement similarity evaluation functionality, such cosine similarity functionality, including one or more of the operations described above with respect to FIGS. 2-6. The communication module 840 may be configured to facilitate communication between the hybrid server 140 of FIG. 1 and entities, such as providers, clinical researchers, and the like.

Although FIGS. 7 and 8 illustrate hardware/software architectures that may be used in data processing systems, such as the hybrid server 140 of FIG. 1 and the data processing system 700 of FIG. 7, respectively, in accordance with some embodiments of the inventive concept, it will be understood that the present invention is not limited to such a configuration but is intended to encompass any configuration capable of carrying out operations described herein.

Computer program code for carrying out operations of data processing systems discussed above with respect to FIGS. 1-8 may be written in a high-level programming language, such as Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the hybrid server 140 of FIG. 1 and the data processing system 700 of FIG. 7 may each be implemented as a single processor system, a multi-processor system, a multi-core processor system, or even a network of stand-alone computer systems, in accordance with various embodiments of the inventive concept. Each of these processor/computer systems may be referred to as a "processor" or "data processing system." The functionality provided by the health care facility interface server 130 and the hybrid server 140 may be merged into a single server or maintained as separate servers in accordance with different embodiments of the inventive concept.

The data processing apparatus described herein with respect to FIGS. 1-8 may be used to facilitate operation of a medical necessity review criteria selection system according to some embodiments of the inventive concept described herein. These apparatus may be embodied as one or more enterprise, application, personal, pervasive and/or embedded computer systems and/or apparatus that are operable to receive, transmit, process and store data using any suitable combination of software, firmware and/or hardware and that may be standalone or interconnected by any public and/or private, real and/or virtual, wired and/or wireless network including all or a portion of the global communication network known as the Internet, and may include various types of tangible, non-transitory computer readable media. In particular, the memory 805 when coupled to a processor includes computer readable program code that, when executed by the processor, causes the processor to perform operations including one or more of the operations described herein with respect to FIGS. 1-6.

Some embodiments of the inventive system may provide a hybrid medical necessity review criteria selection system that may assist a provider, such as a case manager, in performing a medical necessity review of a care plan for a patient. The hybrid medical necessity review criteria selection system makes use of both an AI engine and a knowledge graph to rank potential subsets, such as InterQual criteria subsets, which are used in performing a medical necessity review for a patient. By using both a knowledge graph and an AI engine the accuracy of the rankings of the most likely criteria to be used during a medical necessity review can be improved relative to the use of either the AI engine or knowledge graph alone.

Further Definitions and Embodiments

In the above description of various embodiments of the present inventive concept, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present inventive concept. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

In the above-description of various embodiments of the present inventive concept, aspects of the present inventive concept may be illustrated and described herein in any of a number of patentable classes or contexts including any new and useful process, machine, manufacture, or composition of matter, or any new and useful improvement thereof. Accordingly, aspects of the present inventive concept may be implemented entirely hardware, entirely software (including firmware, resident software, micro-code, etc.) or combining software and hardware implementation that may all generally be referred to herein as a "circuit," "module," "component," or "system." Furthermore, aspects of the present inventive concept may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The description of the present inventive concept has been presented for purposes of illustration and description, but is not intended to be exhaustive or limited to the inventive concept in the form disclosed. Many modifications and variations will be apparent to those of ordinary skill in the art without departing from the scope and spirit of the inventive concept. The aspects of the inventive concept herein were chosen and described to best explain the principles of the inventive concept and the practical application, and to enable others of ordinary skill in the art to understand the inventive concept with various modifications as are suited to the particular use contemplated.

What is claimed is:

1. A method comprising:
   receiving, by one or more processors, input information associated with a health record of a patient, the input information comprising information associated with a plurality of input variables;
   embedding, by the one or more processors, the information associated with the plurality of input variables to generate a plurality of input variable vectors, respectively;
   aggregating, by the one or more processors, the plurality of input variable vectors to generate a patient health record vector;
   generating, by the one or more processors and using a knowledge graph, a first ranking of a plurality of subsets of criteria used for determining an appropriateness of a care plan for the patient based on the patient health record vector;
   generating, by the one or more processors and using an artificial intelligence engine, a second ranking of the plurality of subsets of the criteria used for determining the appropriateness of the care plan for the patient based on the patient health record vector; and
   generating, by the one or more processors, a final ranking of the plurality of subsets of the criteria used for determining the appropriateness of the care plan for the patient based on the first ranking and the second ranking.

2. The method of claim 1, wherein the plurality of input variables comprise encounter diagnoses, medications, lab tests, and procedures.

3. The method of claim 2, wherein nodes of the knowledge graph comprise the plurality of input variables and the plurality of subsets.

4. The method of claim 3, further comprising:
   embedding, by the one or more processors, the plurality of subsets of the criteria used for determining the appropriateness of the care plan for the patient to generate a plurality of subset vectors, respectively;
   wherein generating, using the knowledge graph, the first ranking of the plurality of subsets comprises:
   generating a plurality of similarity scores between the patient health record vector and the plurality of subset vectors, respectively.

5. The method of claim 4, wherein generating the plurality of similarity scores comprises:
   generating a plurality of cosine similarity scores between the patient health record vector and the plurality of subset vectors, respectively.

6. The method of claim 1, wherein the artificial intelligence engine comprises a multi-layer neural network, the method further comprising:
   assigning, by the one or more processors, the plurality of input variables to nodes of an input layer of the multi-layer neural network, respectively; and
   assigning, by the one or more processors, the plurality of subsets of the criteria used for determining the appropriateness of the care plan for the patient to an output layer of the multi-layer neural network, respectively.

7. The method of claim 6, further comprising:
   initializing, by the one or more processors, the nodes of the input layer of the multi-layer neural network with the plurality of input variable vectors;
   embedding, by the one or more processors, the plurality of subsets of the criteria used for determining the appropriateness of the care plan for the patient to generate a plurality of subset vectors, respectively; and
   initializing, by the one or more processors, the nodes of the output layer of the multi-layer neural network with the plurality of subset vectors;
   wherein generating, using the artificial intelligence engine, the second ranking of the plurality of subsets comprises:
   aggregating the plurality of subset vectors to generate an aggregated subset vector; and
   generating, using the multi-layer neural network, a similarity score between the patient health record vector and the aggregated subset vector.

8. The method of claim 7, wherein generating, using the multi-layer neural network, the similarity score comprises:
   generating a plurality of similarity scores between the patient health record vector and the plurality of subset vectors, respectively.

9. The method of claim 8, wherein generating the plurality of similarity scores comprises:
   generating a plurality of cosine similarity scores between the patient health record vector and the plurality of subset vectors, respectively.

10. The method of claim 1, wherein;
    the first ranking comprises a first plurality of confidence scores for the plurality of subsets;
    the second ranking comprises a second plurality of confidence scores for the plurality of subsets; and
    the method further comprises:
    aggregating, by the one or more processors, the first plurality of confidence scores with the second plurality of confidence scores to generate a plurality of aggregated confidence scores; and
    normalizing, by the one or more processors, the plurality of aggregated confidence scores to generate a plurality of normalized aggregated confidence scores.

11. The method of claim 10, wherein aggregating the first plurality of confidence scores with the second plurality of confidence scores comprises determining a weighted average of at least one confidence score from the first ranking and at least one confidence score from the second ranking for each of the plurality of subsets.

12. The method of claim 10, wherein generating the final ranking comprises generating the final ranking of the plurality of subsets of the criteria used for determining the appropriateness of the care plan for the patient based on the plurality of normalized aggregated confidence scores.

13. A system comprising:
    one or more processors; and
    a memory coupled to the processor and comprising computer readable program code embodied in the memory that is executable by the processor one or more memories storing processor-executable instructions that, when executed by one or more processors, cause the one or more processors to perform operations comprising:
    receiving input information associated with a health record of a patient, the input information comprising information associated with a plurality of input variables;

embedding the information associated with the plurality of input variables to generate a plurality of input variable vectors, respectively;

aggregating the plurality of input variable vectors to generate a patient health record vector;

generating, using a knowledge graph, a first ranking of a plurality of subsets of criteria used for determining an appropriateness of a care plan for the patient based on the patient health record vector;

generating, using an artificial intelligence engine, a second ranking of the plurality of subsets of the criteria used for determining the appropriateness of the care plan for the patient based on the patient health record vector; and generating a final ranking of the plurality of subsets of the criteria used for determining the appropriateness of the care plan for the patient based on the first ranking and the second ranking.

14. The system of claim 13, wherein the artificial intelligence engine comprises a multi-layer neural network, and wherein the operations further comprise:

assigning the plurality of input variables to nodes of an input layer of the multi-layer neural network, respectively; and assigning the plurality of subsets of the criteria used for determining the appropriateness of the care plan for the patient to an output layer of the multi-layer neural network, respectively.

15. The system of claim 14, wherein:

the operations further comprise:

initializing the nodes of the input layer of the multi-layer neural network with the plurality of input variable vectors;

embedding the plurality of subsets of the criteria used for determining the appropriateness of the care plan for the patient to generate a plurality of subset vectors, respectively; and initializing the nodes of the output layer of the multi-layer neural network with the plurality of subset vectors; and generating, using the artificial intelligence engine, the second ranking of the plurality of subsets comprises:

aggregating the plurality of subset vectors to generate an aggregated subset vector; and generating, using the multi-layer neural network, a similarity score between the patient health record vector and the aggregated subset vector.

16. The system of claim 13, wherein:

the first ranking comprises a first plurality of confidence scores for the plurality of subsets;

the second ranking comprises a second plurality of confidence scores for the plurality of subsets; and the operations further comprise:

aggregating the first plurality of confidence scores with the second plurality of confidence scores to generate a plurality of aggregated confidence scores; and normalizing the plurality of aggregated confidence scores to generate a plurality of normalized aggregated confidence scores.

17. One or more non-transitory, computer-readable media storing processor-executable instructions that, when executed by one or more processors, cause the one or more processors to perform operations comprising:

receiving input information associated with a health record of a patient, the input information comprising information associated with a plurality of input variables;

embedding the information associated with the plurality of input variables to generate a plurality of input variable vectors, respectively;

aggregating the plurality of input variable vectors to generate a patient health record vector;

generating, using a knowledge graph, a first ranking of a plurality of subsets of criteria used for determining an appropriateness of a care plan for the patient based on the patient health record vector;

generating, using an artificial intelligence engine, a second ranking of the plurality of subsets of the criteria used for determining the appropriateness of the care plan for the patient based on the patient health record vector; and generating a final ranking of the plurality of subsets of the criteria used for determining the appropriateness of the care plan for the patient based on the first ranking and the second ranking.

18. The one or more non-transitory, computer-readable media of claim 17, wherein the artificial intelligence engine comprises a multi-layer neural network, and wherein the operations further comprise:

assigning the plurality of input variables to nodes of an input layer of the multi-layer neural network, respectively; and assigning the plurality of subsets of the criteria used for determining the appropriateness of the care plan for the patient to an output layer of the multi-layer neural network, respectively.

19. The one or more non-transitory, computer-readable media of claim 18, wherein:

the operations further comprise:

initializing the nodes of the input layer of the multi-layer neural network with the plurality of input variable vectors;

embedding the plurality of subsets of the criteria used for determining the appropriateness of the care plan for the patient to generate a plurality of subset vectors, respectively; and initializing the nodes of the output layer of the multi-layer neural network with the plurality of subset vectors; and generating, using the artificial intelligence engine, the second ranking of the plurality of subsets comprises:

aggregating the plurality of subset vectors to generate an aggregated subset vector; and generating, using the multi-layer neural network, a similarity score between the patient health record vector and the aggregated subset vector.

20. The one or more non-transitory, computer-readable media of claim 17, wherein:

the first ranking comprises a first plurality of confidence scores for the plurality of subsets;

the second ranking comprises a second plurality of confidence scores for the plurality of subsets; and the operations further comprise:

aggregating the first plurality of confidence scores with the second plurality of confidence scores to generate a plurality of aggregated confidence scores; and normalizing the plurality of aggregated confidence scores to generate a plurality of normalized aggregated confidence scores.

* * * * *